(12) United States Patent
Steudel

(10) Patent No.: US 7,275,912 B2
(45) Date of Patent: Oct. 2, 2007

(54) MANAGEMENT SYSTEM FOR THE OPERATION OF A WIND TURBINE

(75) Inventor: Dirk Steudel, Kiel (DE)

(73) Assignee: Repower Systems AG, Hamburg (DE)

( * ) Notice: Subject to any disclaimer, the term of this patent is extended or adjusted under 35 U.S.C. 154(b) by 36 days.

(21) Appl. No.: 10/541,699

(22) PCT Filed: Dec. 20, 2003

(86) PCT No.: PCT/EP03/14690

§ 371 (c)(1),
(2), (4) Date: Jul. 7, 2005

(87) PCT Pub. No.: WO2004/063566

PCT Pub. Date: Jul. 29, 2004

(65) Prior Publication Data

US 2006/0147307 A1    Jul. 6, 2006

(30) Foreign Application Priority Data

Jan. 11, 2003  (DE) ................................ 103 00 733

(51) Int. Cl.
*F03D 7/04* (2006.01)
(52) U.S. Cl. ........................................ 416/37; 415/907
(58) Field of Classification Search ................ 415/1, 415/2.1, 4.2, 907; 416/37, 29, 43, 44, 61; 290/44, 55
See application file for complete search history.

(56) References Cited

U.S. PATENT DOCUMENTS

| | | | | |
|---|---|---|---|---|
| 5,289,041 A | * | 2/1994 | Holley | 290/44 |
| 6,856,039 B2 | * | 2/2005 | Mikhail et al. | 290/44 |
| 6,933,625 B2 | * | 8/2005 | Feddersen et al. | 290/44 |
| 6,940,185 B2 | * | 9/2005 | Andersen et al. | 415/907 |
| 7,101,152 B2 | * | 9/2006 | Wobben | 416/1 |

FOREIGN PATENT DOCUMENTS

| | | |
|---|---|---|
| CA | 2 449 218 A1 | 12/2002 |
| DE | 19532409 | 3/1997 |
| DE | 19844258 | 3/2000 |
| DE | 10127451 | 12/2002 |
| EP | 0266715 | 5/1988 |

(Continued)

OTHER PUBLICATIONS

WO 97/09531, Method of Operating a Wind Power Station, Publication Date: Mar. 13, 1997.

(Continued)

*Primary Examiner*—Igor Kershteyn
(74) *Attorney, Agent, or Firm*—Rankin, Hill, Porter & Clark LLP

(57) ABSTRACT

The invention relates to a management system for the operation of a wind turbine, which regulates the power output of the turbine. The wind turbine includes a rotor with at least one rotor blade that is positioned at an adjustable angle to the rotor. The management system regulates the rotor speed within a predefined wind speed range by varying the rotor blade angle in order to set a nominal output and reduces the output in excess of a defined wind-speed-dependent threshold value. The threshold value is a defined rotor blade limiting angle.

6 Claims, 2 Drawing Sheets

FOREIGN PATENT DOCUMENTS

EP          0847496       6/1998
EP          1230479       9/2004

OTHER PUBLICATIONS

WO 00/19094, Control Logic for a Wind Energy System, Publication Date: Apr. 6, 2000.

Hau, Erich; "Windkraftanlagen"; Springer-Verlag Berlin Heidelberg 1988 and 1996.

Cardenas, R. et al.; "Adaptive pitch control for variable speed wind turbines"; Wind Energy Conversion 1995: Proceedings of the 17th British Wind Energy Association Conference; Edited by J.A. Halliday; Warwick; Jul. 19-20, 1995, pp. 243-248; Mechanical Engineering Publications Limited, Bury St. Edmunds and London; XP000612993.

Bossanyi, E.A.; "Adaptive pitch control for a 250 kW wind turbine"; Wind Energy Conversion 1987: Proceedings of the 9th British Wind Energy Association Conference; Edited by J.M Galt; Edinburgh; Apr. 1-3, 1987; pp. 85-92; Mechanical Engineering Publications Limited, London.

Bossanyl, E.A; "Adaptive Control fo the MS2 Wind Turbine - Practical Results"; Wind Engineering; 1989; pp. 259-273; vol. 13, No. 5; Multi-Science Publishing Co., Ltd., Brentwood, Essex, United Kingdom.

* cited by examiner

MANAGEMENT SYSTEM FOR THE OPERATION OF A WIND TURBINE

BACKGROUND OF THE INVENTION

1. Field of the Invention

The invention relates to a management system for the operation of a wind turbine, which regulates the power output of the turbine.

2. Description of Related Art

Generic management systems are used in wind turbines comprising a rotor with at least one rotor blade, wherein the rotor blade is positioned at an adjustable angle to the rotor. The management system regulates the rotor speed within a predefined wind speed range by varying the rotor blade angle in order to set a nominal output.

If a wind turbine is operated while wind speeds are too high, the turbine may be destroyed by the high mechanical load. For that reason, generic management systems are designed such that they turn off the turbine in excess of a defined turn-off wind speed, wherein the turbine is preferably not turned off in an abrupt manner, but by slowly reducing the output. For example, a generic management system is disclosed in DE 195 32 409 A1.

DE 198 44 258 A1 also discloses a management system which is used to reduce the output as soon as the wind speed reaches a predefined value. Herein, reduction in output is also achieved by varying the rotor blade angle. However, reduction in output is already initiated when a wind speed threshold value is reached, wherein the wind speed threshold value is lower than the turn-off wind speed.

The reduction in output is intended to reduce the mechanical load exerted on the turbine, wherein said mechanical load rises with increasing wind speed; thereby, the turbine can be designed with less powerful dimensions, thus also permitting lowering of costs.

Both of the management systems described above start to reduce the output as soon as a defined wind-speed-dependent threshold value is reached. Said threshold value is based on the wind speed measured. Usually, the wind speed is measured by means of a nacelle anemometer. This measurement method is relatively inaccurate and, thus, fails to provide a good indicator of the load exerted on the turbine.

For that reason, the threshold value in excess of which the management system reduces the output a wind turbine should not be based on the wind speed measured but on an input variable that can be determined more easily, both physically and with regard to the controller used.

BRIEF SUMMARY OF THE INVENTION

The present invention aims at creating a management system that uses a threshold value with the features mentioned above.

As is the case with the generic management system, the management system according to the invention is also used in wind turbines which comprise a rotor with adjustable rotor blades, wherein the management system is designed such that it regulates the rotor speed within a predefined wind speed range by varying the rotor blade angle in order to set a nominal output.

To this end, the rotor blade angle is increased once the nominal speed is reached with increasing wind speed, whereby the nominal speed and, thus, the nominal output as well can be maintained despite increasing wind speed, as has already been described above. The management system starts to reduce the output as soon as a defined wind-speed-dependent threshold value is reached.

Therein, the management system according to the invention uses a defined rotor blade limiting angle as threshold value. Said rotor blade limiting angle is the rotor blade angle that results at a wind force corresponding to the turn-off wind speed and is used to set the nominal output. The rotor blade limiting angle is depending on the particular rotor blade used and can be determined empirically by measurements and/or simulations.

Using the rotor blade limiting angle as threshold value is to advantage in that it is an input variable that can be determined easily by the controller used, because the rotor blade angle is already known from the set nominal output. Furthermore, the rotor blade limiting angle is a direct indicator of the current load exerted on the turbine, thus representing an input variable for the reduction of said load that is more reliable than the indirectly measured wind speed.

In a preferred embodiment of the invention, the present management system is designed such that the output is reduced by further varying the rotor blade angle once the rotor blade limiting angle is exceeded. Herein, the angle of the rotor blade to the rotor is increased.

This is to advantage in that the turbine is not turned off promptly when the turn-off wind speed is reached, but the power output is reduced slowly until a turn-off output is reached and the turbine can be disconnected from the power supply. On the one hand, this procedure provides the advantage of a better compatibility with the external power supply system. On the other hand, it allows an extended power curve and an improved energy yield.

In a further preferred embodiment, the present management system is designed such that the rotor blade angle is maintained at a largely constant value until the nominal output is reached.

After the nominal output has been reached, the present management system is designed such that the rotor blade angle is set in relation to the wind speed, i.e. the rotor blade angle is increased or reduced depending on the wind speed value, in order to maintain the nominal output at a constant value.

The management system according to the invention regulates the power output of a wind turbine in excess of the turn-off speed in an advantageous manner, i.e. in relation to the rotor blade angle only. Any additional measurement variables, such as the wind speed which, owing to unfavorable conditions, can be determined only difficultly and are, therefore, often inaccurate, are not necessary any longer.

BRIEF DESCRIPTION OF THE DRAWINGS

Below, the invention will be illustrated in more detail by means of two figures. In the figures.

DETAILED DESCRIPTION OF THE INVENTION

Figure 1:
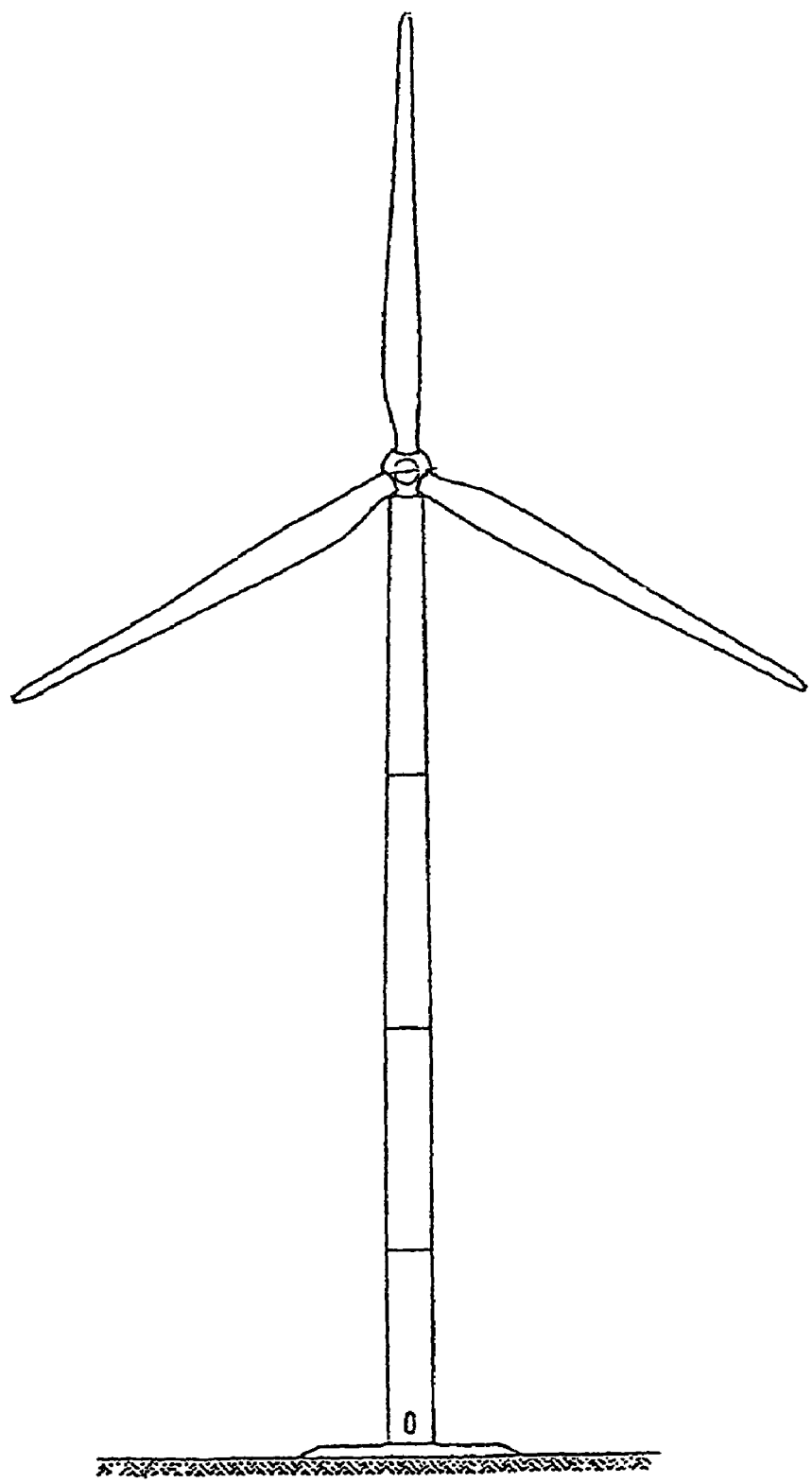
FIG. 1 is a front view of a wind turbine.

FIG. 1 is the top view of a wind turbine (1) with a tower (2) that is set up on the ground and at the top of which a rotatable nacelle carries a rotor (3) that rotates about a horizontal axis and comprises three rotor blades (5), wherein said rotor blades are positioned at an adjustable angle to the rotor.

Figure 2:
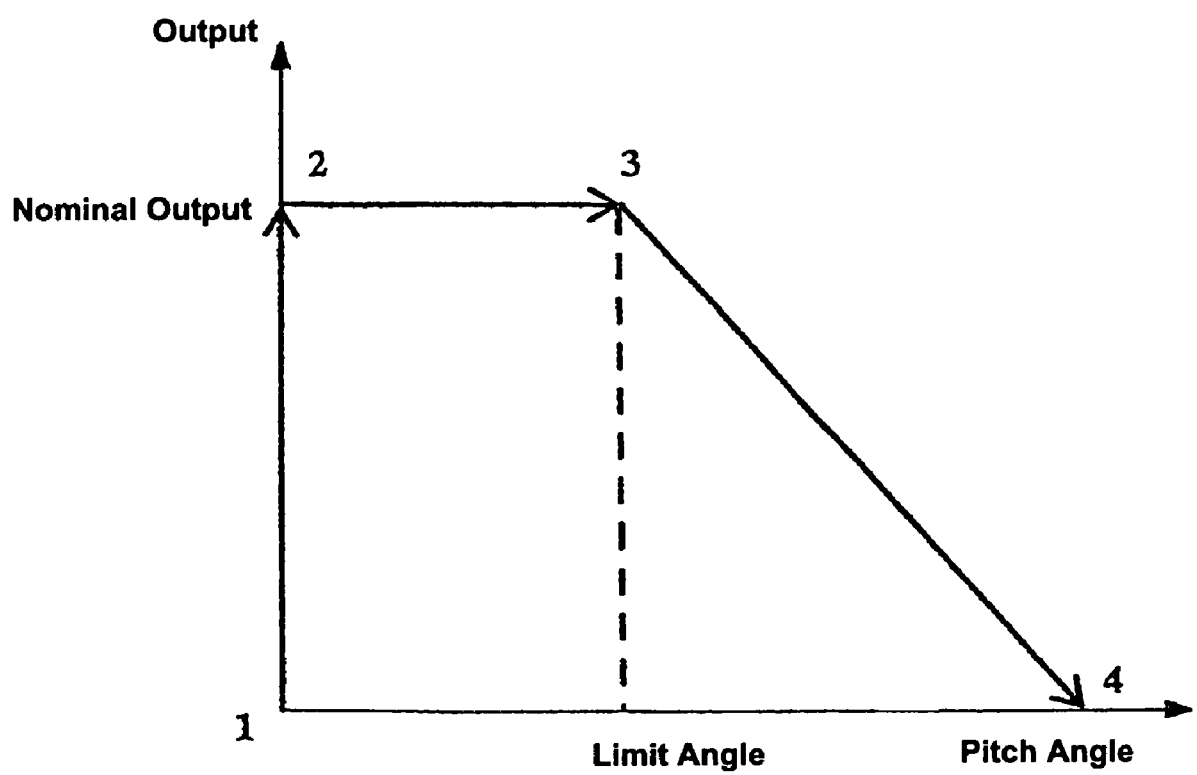
FIG. 2 is a schematic diagram representing the regulation of the nominal output in relation to the rotor blade angle.

FIG. 2 is a schematic diagram representing the regulation of the nominal output in relation to the rotor blade angle, wherein it is assumed that the wind speed is rising steadily.

At point 1 in FIG. 2, the turbine starts running. Between point 1 and point 2, the turbine follows a torque-speed characteristic of a generator provided in the turbine, until the nominal output is reached. The rotor blade angle is not changed in this stage. At point 2, the turbine has reached the nominal output.

Once point 2 has been exceeded, the wind speed is higher than necessary for generating the nominal output; for that reason, the management system starts to regulate the output via the rotor blade angle. To achieve this, the management system increases the rotor blade angle, whereby the lift of the rotor blades is lowered and the rotor speed and, thus, the output is reduced. As a result, a constant nominal power can be output by varying the rotor blade angle.

As shown between points 2 and 3 in FIG. 2, the rotor blade angle is steadily increased with rising wind speed to ensure that the nominal output of the turbine remains at a constant value. At point 3, the wind speed reaches a value where the management system adjusts the rotor blade to an angle corresponding to a limiting angle represented in FIG. 2. Once the limiting angle is exceeded, the management system starts to reduce the output of the turbine. To achieve this, the rotor blade angle is increased such that the power output is steadily reduced until the turbine reaches a turn-off output as shown at point 4 in FIG. 2.

In further embodiments of the invention, the output can also be reduced in a different manner, for example in the form of steps or exponentially.

The invention claimed is:

1. A management system for the operation of a wind turbine which regulates the power output of the turbine, wherein the wind turbine comprises a rotor with at least one rotor blade that is positioned at an adjustable angle to the rotor and wherein the management system regulates the rotor speed within a predefined wind speed range by varying the rotor blade angle in order to set a nominal output and reduces, in excess of a defined wind-speed-dependent threshold value, the power output of the operating turbine to a quantity that is less than the nominal output but greater than an output where the wind turbine is turned off, and wherein the defined wind-speed-dependent threshold value is a defined rotor blade limiting angle.

2. A management system according to claim 1, wherein the management system varies the rotor blade angle in order to reduce the output.

3. A management system according to claim 2, wherein the management system increases the rotor blade angle in order to reduce the output.

4. A management system according to claim 1, wherein the management system maintains the rotor blade angle at a constant value until the nominal output is reached.

5. A management system according to claim 1, wherein once the nominal output has been reached, the management system adjusts the rotor blade angle in relation to the wind speed in order to maintain the nominal output at a constant value.

6. A method of regulating the power output of a wind turbine having at least one rotor blade that is positioned at an adjustable angle to the rotor comprising the steps of:

regulating the rotor speed within a predefined wind speed range by varying the rotor blade angle in order to set a nominal output; and reducing the output of the operating turbine, in excess of a defined wind-speed-dependent threshold value, to a quantity that is less than the nominal output but is greater than an output where the wind turbine is turned off, wherein the defined wind-speed-dependent threshold value is a defined rotor blade limiting angle.

* * * * *